United States Patent [19]

Chever

[11] 4,355,714
[45] Oct. 26, 1982

[54] BUCKET ELEVATOR

[75] Inventor: René Chever, Paris, France

[73] Assignee: Fives-Cail Babcock, Paris, France

[21] Appl. No.: 832,825

[22] Filed: Sep. 13, 1977

[30] Foreign Application Priority Data

Sep. 15, 1976 [FR] France ................. 76 27649

[51] Int. Cl.$^3$ ............................................. B65G 17/36
[52] U.S. Cl. ................................................... 198/701
[58] Field of Search ................. 198/509, 701, 703; 214/15 D, 15 E

[56] References Cited

U.S. PATENT DOCUMENTS

| | | | |
|---|---|---|---|
| 1,353,336 | 9/1920 | Getz | 198/703 |
| 3,062,392 | 11/1962 | Eppard | 198/509 |
| 3,469,715 | 9/1969 | Bocchietti | 198/509 |
| 3,756,375 | 9/1973 | Briggs | 198/509 |
| 3,917,051 | 11/1975 | Pennings et al. | 198/703 |

FOREIGN PATENT DOCUMENTS

| | | | |
|---|---|---|---|
| 351441 | 4/1922 | Fed. Rep. of Germany | 198/509 |
| 1291244 | 3/1969 | Fed. Rep. of Germany | 214/150 |
| 1283682 | 8/1972 | United Kingdom | 198/509 |

Primary Examiner—Joseph E. Valenza
Attorney, Agent, or Firm—Kurt Kelman

[57] ABSTRACT

In a bucket elevator having two traction members guided in parallel loops by upper and lower guide wheels, and buckets spacedly mounted between the traction members, the rim of at least one of the upper guide wheels defines a free space about its axis of rotation, and one or more rollers mounted on the supporting structure in the free space engage the rim for supporting and/or driving the wheel so that the material discharged from the buckets during travel over the upper guide wheels can be conveyed further by a chute extending axially through the one upper guide wheel.

8 Claims, 3 Drawing Figures

BUCKET ELEVATOR

BACKGROUND OF THE INVENTION

This invention relates to materials handling equipment, and particularly to apparatus for transporting bulk material in which receptacles mounted between two traction members receive the material to be transported and discharge the received material by gravity when the traction members travel over respective guide wheels.

The invention will be described in its more specific application to a bucket elevator of the type employed for recovering bulk material from the hold of a ship, but other applications of the invention will readily suggest themselves to those skilled in the art.

In the type of elevator chosen for illustrating the invention, approximately cup-shaped receptacles or buckets are mounted in spaced relationship between two traction members, such as cables, chains, or belts which are trained over a pair of upper guide wheels and a pair of lower guide wheels in respective closed loops. The material scooped up by the buckets during and after travel over the lower guide wheels is discharged from the buckets by gravity as they travel over the upper guide wheels. The discharged material is collected and further conveyed away from the elevator.

The discharged material must be caught in the zone between the loops of the traction members and taken laterally out of the zone. Because the spokes of conventional guide wheels restrict the location of the necessary chute or the like, some of the height gained by the transported material on the elevator is again lost when the material is dropped on a chute mounted below the upper guide wheels.

SUMMARY OF THE INVENTION

It is a primary object of this invention to improve the known elevator arrangement in such a manner that the vertical displacement of the transported material brought about by the elevator is more fully utilized.

It has been found that spokes or the like on one of the upper guide wheels of an elevator of the type described can be avoided by supporting and/or driving the one guide wheel by means of at least one roller mounted on the supporting structure in a free space about the axis of rotation of the guide wheel which is bounded in a radially outward direction by the rim of the wheel, the roller making rolling, pressure transmitting contact with the wheel rim.

DETAILED DESCRIPTION

Other features, additional objects, and many of the attendant advantages of this invention will readily be appreciated as the same becomes better understood by reference to the following detailed description of preferred embodiments when considered in connection with the appended drawing in which.

Figure 1:
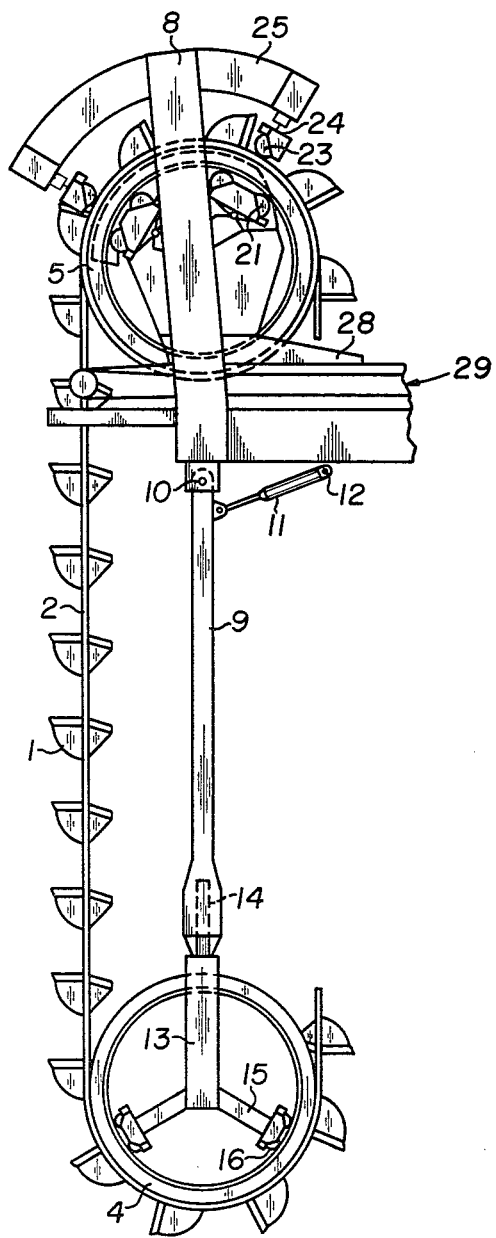
FIG. 1 shows a bucket elevator of the invention in fragmentary front elevation.
Figure 2:
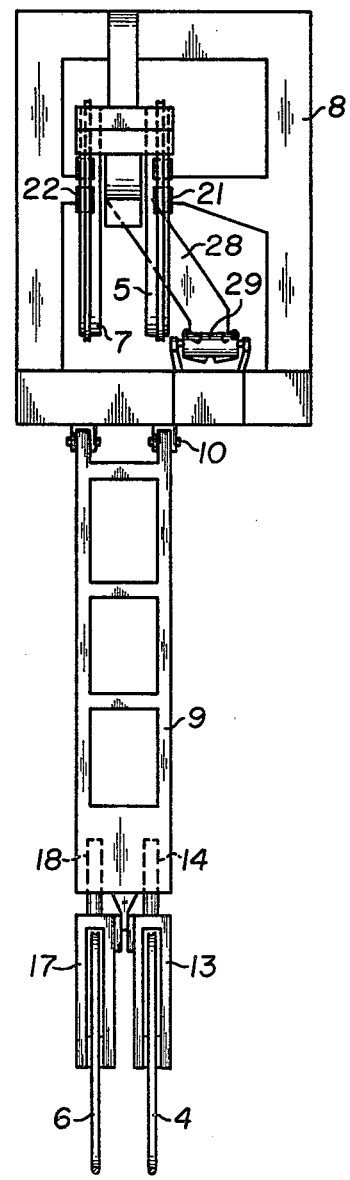
FIG. 2 illustrates the apparatus of FIG. 1 in side elevation.

Referring initially to FIGS. 1 and 2, there is seen only as much of a traveling bucket elevator as is needed for an understanding of the invention. The supporting structure of the elevator includes a gantry traveling along a pier to which ships are moored. Only the boom 8 of the gantry is partly seen in the drawing. Its free end may be located above the open hatch of a ship to be unloaded, and an arm 9 suspended from the boom by means of pivots 10 may be lowered into the hold of the ship and swung about the pivots 10 by means of a hydraulic jack 11 hingedly fastened to the boom 8 by a pivot pin 12.

The arm 9 is a flat skeleton frame from whose lower, free end two wheel forks 13, 17 depend on respective hydraulic jacks 14, 18. Circumferentially grooved lower guide wheels 4, 6 are mounted in the forks 13, 17 for normal rotation about a common axis, but may be shifted vertically relative to each other by the jacks 14, 18.

The wheels 4, 6 are held by respective cables 2 in rolling, abutting engagement with guide rollers 16 mounted on the associated forks 13, 17 by means of radial arms 15. The rollers engage the circular, internal rim face of each wheel 4, 6 which bounds a free space about the wheel axis.

The cables are trained in closed, parallel, axially spaced loops over the lower guide wheels 4, 6 and two upper guide wheels 5, 7 and carry therebetween elevator buckets 1. The wheels 5, 7 have circular rims which bound free spaces about the common axis of wheel rotation. They are supported on respective sets of rollers 21, 22 mounted on the boom 8 in the free spaces within the wheel rims. The wheels are driven by additional sets of rollers 23 engaging the outer circumference of each wheel rim with a contact pressure controlled by pneumatic jacks 24 mounted on a bracket 25 on the boom 8.

A hopper 28 mounted axially between the upper guide wheels 5, 7 terminates in a chute which passes obliquely downward through the free space in the center of the wheel 5 to a belt conveyor 29 axially spaced from both wheels 5, 7 in the same direction and leads to the end of the boom 8 omitted from the drawing.

Figure 3:
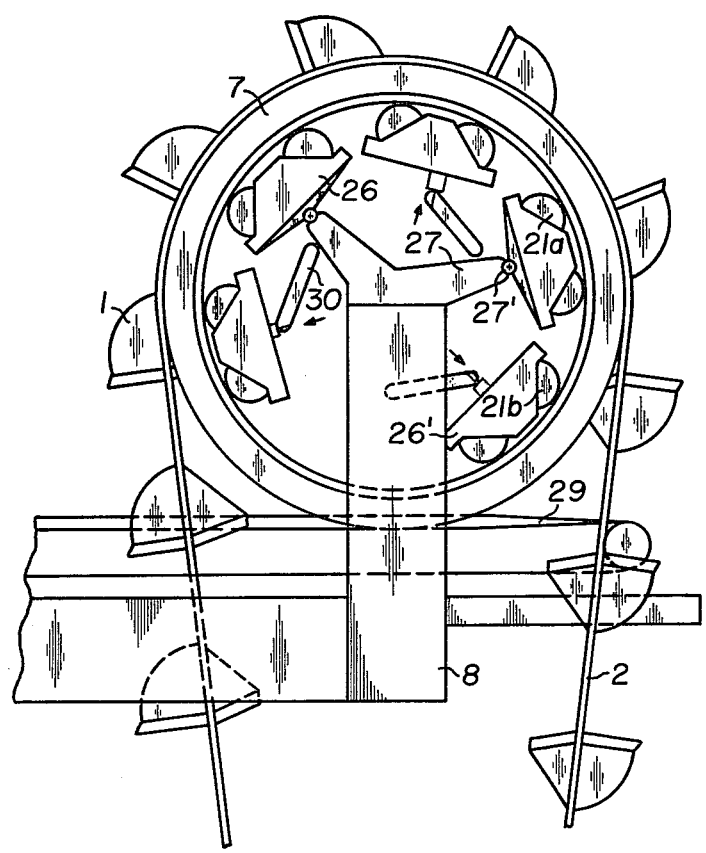
FIG. 3 shows a modified detail in the apparatus of FIG. 1 in a corresponding view on a larger scale.

In the modified bucket elevator of the invention partly shown in FIG. 3, the outer circumferences of the upper guide wheels are not encumbered by guide or drive rollers. The wheels, as illustrated in FIG. 3 for wheel 7 only, are supported on four rollers 21a mounted in pairs on trucks 26. The trucks are fastened to the boom 8 by arms 27 axially extending into the free space bounded by the rim of the wheel 7 in a radially outward direction and may pivot on bearing 27' about axes parallel to the wheel axis. The trucks 26 with the guide rollers 21a mounted thereon are circumferentially interposed between three similar trucks 26' carrying each a drive motor (not shown) and two rollers 21b driven by the motor. The trucks 26' are spring-mounted on the arms 27 and their motion-transmitting contact pressure against the inner rim of the wheel 7 is maintained and may be controlled by pneumatic jacks 30.

The hopper and chute which guide the material dropped from the buckets 1 to a conveyor 29 has been omitted from FIG. 3 in order not to crowd the drawing. As is evident from the converging straight loop portions of the cable 2 shown in FIG. 3, the lower guide wheels, not themselves seen in FIG. 3, are smaller in diameter than the top guide wheel 7. The structure omitted from the showing of FIG. 3 may otherwise be identical with what has been illustrated more fully in FIGS. 1 and 2.

The illustrated friction drives have been found effective in bucket elevators transporting heavy material at high speed. However, slippage between the driven rollers and the rims of the guide wheels may be prevented entirely by providing meshing gear teeth on the engaged surfaces in an obvious manner.

Necessary tension in the cables 2 is maintained by the jacks 14, 18, and the axes of the wheels 4, 6 may be offset from each other to some extent without affecting the operation of the elevator if necessary to compensate for different stretching of the two cables 2.

All four guide wheels of the illustrated bucket elevators are free from spokes and supported and driven by rim-engaging rollers mounted on the supporting structure. Such as arrangement is preferred because it simplifies maintenance operations. However, one of the most important objects of this invention is achieved if only the wheel 5 is free from spokes or other rotating wheel elements encumbering the space outwardly bounded by the wheel rim.

The number and location of the driven rollers may be chosen to suit specific operating conditions. When the material to be transported is relatively light, a single drive roller acting on the inner or outer circumference of a single wheel rim may suffice. If at least one wheel has spokes and a central hub, that wheel may be driven by a shaft fastened to the hub in a conventional manner, and the rim-engaging rollers may only transmit the weight of an associated wheel to the supporting structure, no roller being part of the drive mechanism.

However, this invention has found its most important application in the removal of heavy bulk material, such as ore, from the hull of freighters, and the illustrated embodiments have proven most advantageous for such application.

When both upper guide wheels are of the illustrated type, a belt conveyor may pass through both free spaces within the wheel rims, and only baffles or similar simple devices are needed for guiding the bulk material discharged by gravity through the apertures of the buckets 1 to the conveyor belt.

Other changes in the specifically illustrated embodiments of the invention will readily suggest themselves to those skilled in the art. It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In apparatus for transporting material, including a support, two traction members, guide means for guiding said traction members on said support in respective, spacedly parallel, closed loops, drive means for simultaneously moving said traction members in said loops, a plurality of receptacles mounted between said traction members for receiving the material to be transported, and conveying means for further moving material transported by said receptacles, the improvement in said guide means which comprises:

(a) two pairs of wheels,
   (1) the wheels of each pair being mounted on said support for rotation about respective axes, one of the axes being upwardly spaced from the other axis,
   (2) said traction members being trained over respective wheels of each pair, and
   (3) each of said wheels of one of said pairs having an annular rim portion bounding a free space about the associated axis in a radially outward direction; and (b) at least one roller rotatably mounted on said support in each of said free spaces in rolling, pressure transmitting and frictional contact with said rim portions and supporting said wheels on said support.

2. In apparatus as set forth in claim 1, said drive means including means for rotating at least one of said rollers.

3. In apparatus as set forth in claim 1, said drive means including a driven roller mounted on said support in driving engagement with the rim portion of one of said wheels, said wheels, said driven roller being offset from the engaged rim portion in a radially outward direction, and jack means for maintaining motion transmitting contact pressure between said driven roller and said engaged rim portion.

4. In apparatus as set forth in claim 1, said driven means including means for rotating one of said rollers in said free space, and jack means for maintaining motion transmitting contact pressure between the roller rotated by said drive means and the associated rim portion.

5. In apparatus as set forth in claim 1, said traction members being trained over said one pair in respective arcs long enough to cause a predetermined angular movement of the associated receptacles, said receptacles being apertured to cause discharge or the received material by gravity during said angular movement, the improvement in said conveying means which comprises a conveying member passing through the free space bounded by the rim portion of at least one wheel of said one pair, a portion of said conveying member being located between said wheels for receiving said material discharged by gravity, and another portion of said conveying member being spaced axially from both wheels in the same direction.

6. In apparatus as set forth in claim 5, said receptacles being cup-shaped and open in the direction of movement of said traction members.

7. An apparatus as set forth in claim 6, wherein said wheels define two vertically extending, substantially straight portions of each loop, and arcuate portions of each loop connecting the straight portions.

8. An apparatus as set forth in claim 7, wherein the wheels of said other pair have respective rim portions bounding a free space in each wheel of said other pair, said guide means further including at least one roller associated with each wheel of said other pair, the roller being rotatably mounted on said support and engaging the rim portion of the associated wheel in rolling contact.

* * * * *